No. 708,494. Patented Sept. 2, 1902.
J. RANDALL.
APPARATUS FOR EXTRACTING METALS FROM ORES.
(Application filed May 23, 1902.)
(No Model.)
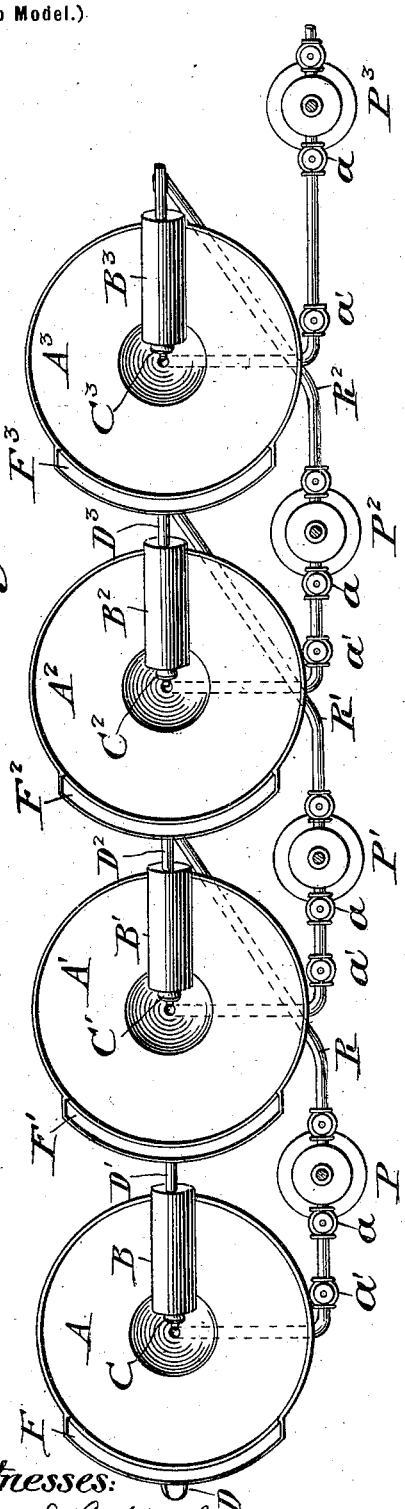
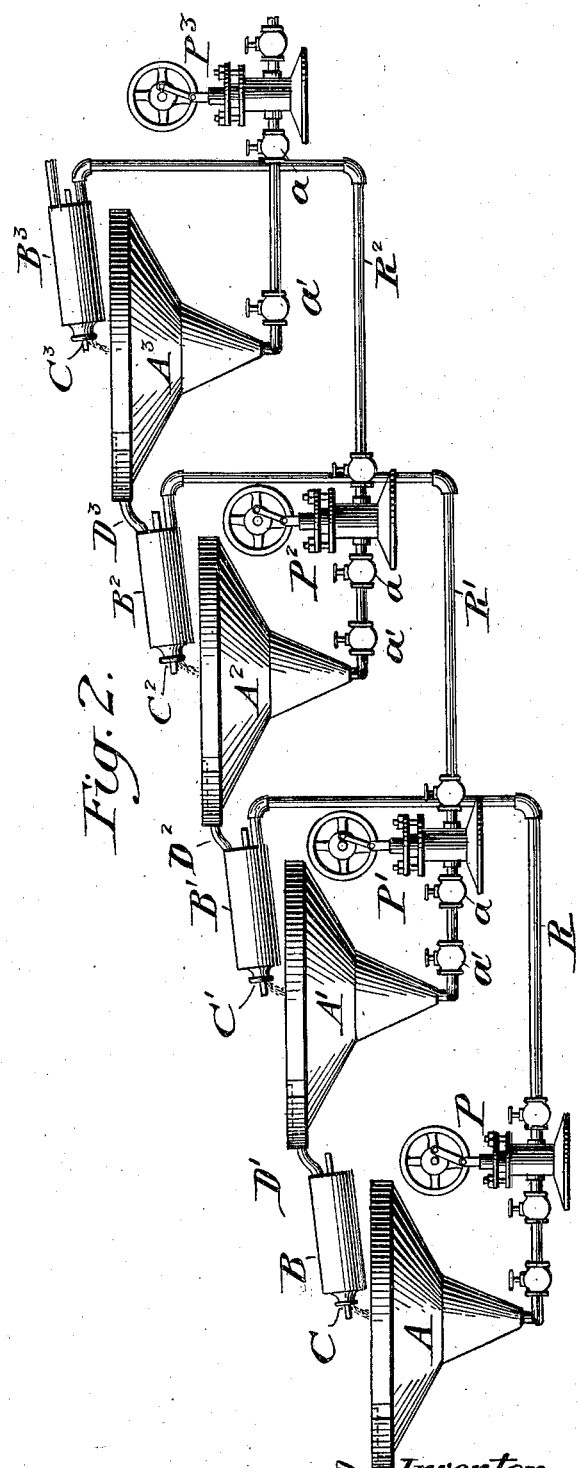
Witnesses:
Inventor
John Randall
per James A. Gurse
Attorney

UNITED STATES PATENT OFFICE.

JOHN RANDALL, OF DEADWOOD, SOUTH DAKOTA.

APPARATUS FOR EXTRACTING METALS FROM ORES.

SPECIFICATION forming part of Letters Patent No. 708,494, dated September 2, 1902.

Application filed May 23, 1902. Serial No. 108,722. (No model.)

*To all whom it may concern:*

Be it known that I, JOHN RANDALL, a citizen of the United States, residing at Deadwood, in the county of Lawrence and State of South Dakota, have invented a new and useful Improvement in Apparatus for Extracting Metal from Ores, &c., of which the following is a specification.

The object of my invention is to construct an apparatus adapted to treat ores or "slimes" for the extraction in solution of the precious metals therefrom by what is known as the "wet" process, making the same continuous, and thereby lessening the labor, delay, and cost of handling and storing large quantities of dilute washes and solutions.

It has for a further object an improved process of lixiviation or dissolution of the soluble and useful constituents of ores, slimes, earthy materials, or other solids by passing the same through a series of mixers or agitators and decanting vessels—through the latter in one direction, while the lixiviant or solvent liquid passes through the apparatus in the opposite direction; and for these purposes my invention consists in the peculiar construction, arrangement, and combination of a series of tanks, agitators, and conveyers, as hereinafter described, and claimed in the accompanying drawings, forming a part of this specification.

Figure 1 is a plan view of an apparatus embodying my invention, and Fig. 2 is a side view thereof.

Similar letters indicate like parts in the figures.

A, A', $A^2$, and $A^3$ each respectively designate one of a series of tanks, decanting vessels, or settler-cones, each having a bottom outlet with a valve $a'$ therein, and also having at its upper edge, on one side thereof, an overflow-lip, (designated as F, F', $F^2$, and $F^3$,) with outlet D and pipes D', $D^2$, and $D^3$, respectively, for the several tanks. A series of mixers or agitators B, B', $B^2$, and $B^3$, of any ordinary and well-known form and not claimed *per se* herein, are so located above the tanks as to be adapted to receive the overflow of the solvent liquid from the tanks A', $A^2$, and $A^3$ and to discharge the same into the tanks A, A', and $A^3$, respectively. The bottom outlets of the tanks A, A', and $A^2$ are in communication with the mixers B', $B^2$, and $B^3$ by means of the pipes R, R', and $R^2$, respectively, so that the ore in said tanks may, by means of pumps P, P', and $P^2$, be forced from said tanks to said mixers. The series of tanks and mixers is shown as consisting of four in number; but the number employed may be more or less than four, if so desired, the feature being that the ore is conveyed from the bottom of one tank to an agitator discharging into an adjacent tank, while the overflow-water of said adjacent tank discharges into an agitator discharging into the tank from which the ore is taken, the general direction of movement of the solvent, and the ore being opposite. The tanks, which are preferably of the form shown—*i. e.*, having conical bottoms—are located in ascending planes, and the mixers or agitators are inclined, so that the current of the solvent will aid the passage of the ore through the mixers.

The form of construction of the tank shown herein, but not specifically described nor claimed, is shown, described, and claimed in another application filed by me bearing date of June 10, 1902, Serial No. 111,049.

In the operation the solids containing the metals to be extracted are fed into the agitator B by the spout E from any suitable receptacle or source of supply and there mixed, with the lixiviant or solvent wash decanting or overflowing from the top of the tank A' and from thence passing through the outlet C of the mixer B into the tank A. After sufficient saturation the solution is decanted from A at the discharge D, as the finished lixivium or product of the process, to await the recovery of the metal therefrom by any of the well-known processes, while the solids subside or settle, and, together with a comparatively small quantity of the fluid, are, by means of the pump P, pumped into the end of the agitator B' adjacent to the tank $A^2$, where they mix with the decanted fluid flowing from the tank $A^2$ and after mixing with the same are discharged into the tank A' and again subsiding are pumped by the pump P' through the pipe R' into the agitator $B^2$, where they mix with the decanting fluid from the tank $A^3$, and from thence are discharged into the tank $A^2$. The subsiding solids are pumped from the tank $A^2$ by the pump $P^2$, through the pipe $R^2$ into the agitator $B^3$, where they mix with the fresh solvent or liquid wash suitably introduced into the same and from thence discharged into the tank $A^3$, from which it is pumped by the pump $P^3$ to the waste as residuum.

It will be noticed that the solvent fluid first enters the apparatus at the last mixer or agitator $B^3$, mixing while fresh or strong with the exhausted solids, and then passes down through the series, the overflow directly entering the top of the tanks after passing through the agitators, respectively, while the solids pass upward along the series, being finally discharged as residuum from the bottom of the last tank $A^3$ by the pump $P^3$.

By the employment of the agitators above the tanks and causing the overflow of the solvent from a tank to pass into an agitator at the same end thereof as the ore enters and from thence into the top of the tank directly below said agitator there is no obstruction offered to the free passage of the ore from one tank to another, while at the same time the current of the solvent liquid aids the passage of the ore through the agitator, so that the ore and solvent are brought into close and prolonged relation, so that by the time the residuum is discharged from the last tank of the series all trace of metal that can be is dissolved and is in solution in any suitable receivers in communication with the solvent-outlet D of the tank A.

Having thus described my invention, what I desire to claim and secure by Letters Patent is—

1. In an apparatus for treating ores, the combination of a series of tanks with a series of agitators above said tanks and discharging into the same, so arranged that the overflow of the solvent fluid from each tank discharges into the agitator over the next adjacent tank and from thence into the latter, and means for conveying the ore from the bottom of each of said tanks into the agitator directly above the adjacent tank for discharge into the latter, substantially as described.

2. In an apparatus for treating ores, a series of tanks with outlets at the bottoms thereof and provided with lips at the upper edges having discharge-outlets, a series of agitators above said tanks adapted to discharge their contents into the tops thereof, and means for conveying the ore from each said tanks into the agitator directly above the adjacent tank for discharge into the latter, said parts being combined substantially as described.

3. In an apparatus for treating ores, a series of tanks with outlets at the bottom thereof, a series of agitators adapted to discharge their contents into the tops of said tanks and means for conveying the contents of each of said tanks into the agitator directly above the adjacent tank for discharge into the latter, each of said tanks having a lip with discharge leading into the ore-receiving end of the agitator whereby the ore and fluid pass through the agitator in the same direction, said parts being combined substantially as described, 4. In an apparatus for treating ores, a series of tanks, each having an outlet in its bottom, a series of agitators adapted to discharge into said tanks and pipes with pumps for conveying ore from the outlets in the bottoms of each of said tanks to the agitators discharging into the adjacent tank, each of said tanks having solvent-liquid-overflow outlets discharging into the ore-receiving ends of said agitators, said parts being combined substantially as described.

5. In an apparatus for treating ores, a series of tanks, a series of agitators above said tanks, and means for forcing ore from the bottom of each of said tanks except the last one thereof to the agitator discharging into the adjacent tank, each of said tanks having a solvent-outlet discharging into an agitator at the ore-receiving end thereof, said parts being combined substantially as described.

In testimony whereof I have signed my name to this specification in the presence of two subscribing witnesses.

JOHN RANDALL.

Witnesses:
RAY D. HUBBARD,
MILTON L. BALDY.